(12) United States Patent
Hunziker

(10) Patent No.: US 8,620,365 B2
(45) Date of Patent: Dec. 31, 2013

(54) METHOD FOR HANDLING AN ELECTRONIC REQUEST WITH THE AID OF AN INTERMEDIARY ENTITY

(75) Inventor: Bruno Hunziker, Oberglatt (CH)

(73) Assignee: Halter's Chop Chop, Meilen (CH)

(*) Notice: Subject to any disclaimer, the term of this patent is extended or adjusted under 35 U.S.C. 154(b) by 0 days.

(21) Appl. No.: 13/614,691

(22) Filed: Sep. 13, 2012

(65) Prior Publication Data

US 2013/0005368 A1    Jan. 3, 2013

Related U.S. Application Data

(63) Continuation of application No. 13/386,152, filed as application No. PCT/EP2009/059301 on Jul. 20, 2009, now abandoned.

(51) Int. Cl.
| | |
|---|---|
| H04W 4/00 | (2009.01) |
| H04M 11/00 | (2006.01) |
| H04M 1/00 | (2006.01) |
| H04L 12/66 | (2006.01) |
| H04L 12/28 | (2006.01) |
| H04L 12/56 | (2011.01) |

(52) U.S. Cl.
USPC ..... 455/466; 455/403; 455/422.1; 455/426.1; 455/550.1; 455/552.1; 455/560; 370/352; 370/389; 370/401

(58) Field of Classification Search
USPC ........... 455/33.1, 53.1, 54.1, 403, 414.1, 421, 455/422, 426, 454, 550.552, 560, 466, 455/426.1, 422.1, 550.1, 552.1; 370/352, 370/389, 401; 379/57, 89, 207.11, 265.09
See application file for complete search history.

(56) References Cited

U.S. PATENT DOCUMENTS

| | | | |
|---|---|---|---|
| 7,903,806 B1 * | 3/2011 | Pester, III | ..................... 379/230 |
| 2004/0006538 A1 | 1/2004 | Steinberg et al. | |

(Continued)

FOREIGN PATENT DOCUMENTS

| | | |
|---|---|---|
| EP | 0825788 A2 | 2/1998 |
| EP | 1887811 A1 | 2/2008 |
| GB | 2 398 969 A | 9/2004 |
| WO | 03/053083 A2 | 6/2003 |

OTHER PUBLICATIONS

Kapsalis, et al., "OPC-SMS: A Wireless Gateway to OPC-based Data Sources" Computer Standards and Interfaces, Elsevier Sequoia, Lausanne, CH, vol. 24, No. 5, Nov. 1, 2002, pp. 437-451.

(Continued)

*Primary Examiner* — Inder Mehra
(74) *Attorney, Agent, or Firm* — Pearne & Gordon LLP

(57) ABSTRACT

A method for handling an electronic request between two entities with the aid of an intermediary entity as well as uses of the method are disclosed. A first entity sends a request intended for a second entity via an open, first communication network such as the Internet to an intermediary entity, which then forwards the request as a text message such as an SMS message via a secure, second communication network such as a GSM network to the second entity, which indicates acceptance of the request by sending a text message back to the intermediary entity, or rejects the request by e.g. not responding. The intermediary entity then either confirms that the request has been accepted if the second entity has responded within a maximum response time or otherwise indicates rejection of the request by the second entity by sending a corresponding text message to the first entity.

20 Claims, 2 Drawing Sheets

(56) References Cited

U.S. PATENT DOCUMENTS

Figure 1:
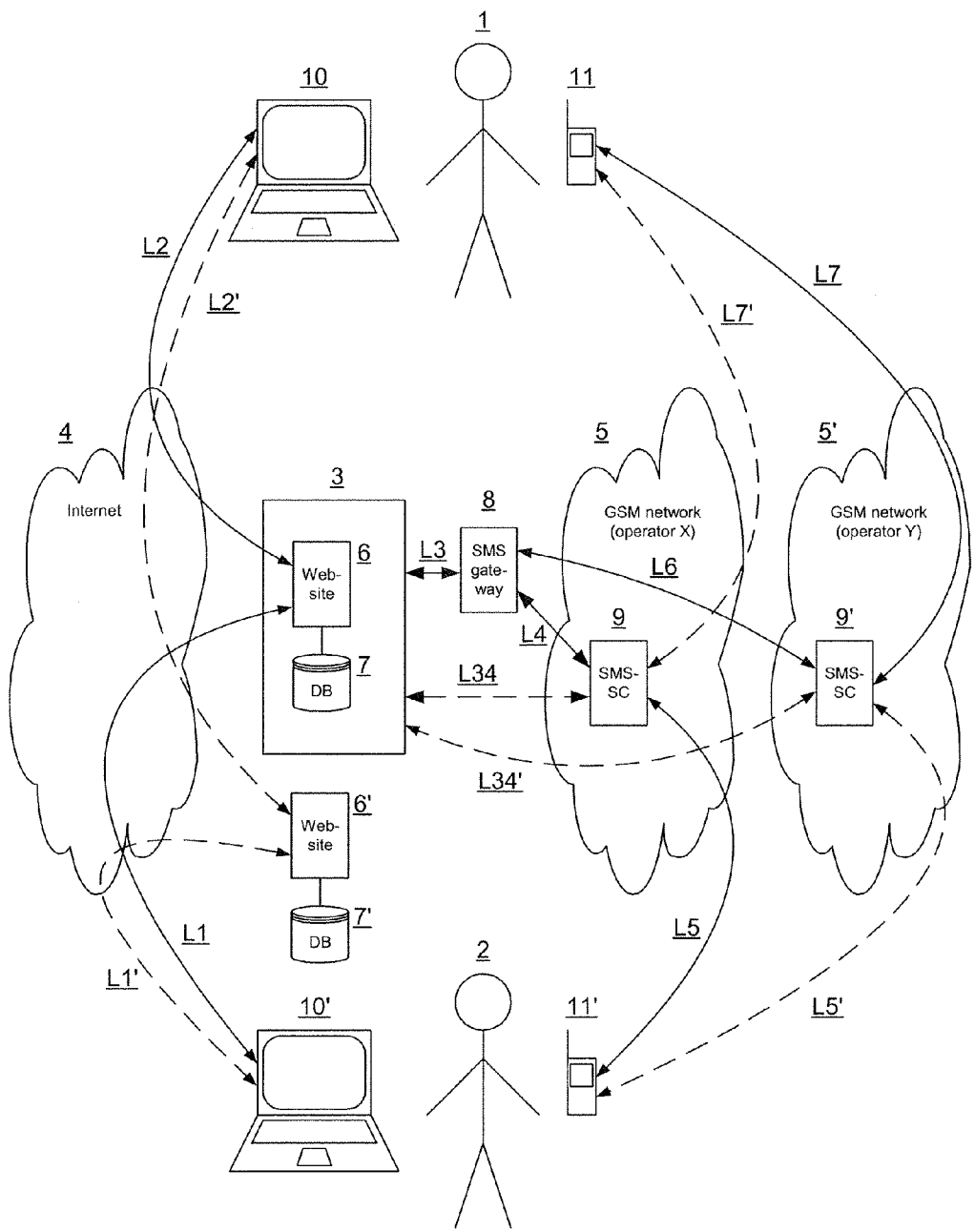

| | | |
|---|---|---|
| 2006/0015559 A1* | 1/2006 | Yabe et al. .................... 709/206 |
| 2006/0034270 A1* | 2/2006 | Haase et al. .................. 370/389 |
| 2006/0153346 A1 | 7/2006 | Gonen et al. |
| 2007/0238453 A1* | 10/2007 | Chang ........................... 455/421 |
| 2007/0253405 A1* | 11/2007 | Willis et al. .................... 370/352 |
| 2008/0256179 A1* | 10/2008 | Gorty et al. ................... 709/203 |
| 2008/0285738 A1* | 11/2008 | Misra et al. ............. 379/265.09 |
| 2009/0110170 A1* | 4/2009 | Haley ....................... 379/207.11 |
| 2009/0125624 A1* | 5/2009 | Chevalier et al. ............. 709/225 |
| 2009/0327310 A1* | 12/2009 | Bengtsson et al. ............. 707/10 |
| 2010/0070599 A1* | 3/2010 | Nixon et al. .................. 709/206 |
| 2011/0225062 A1* | 9/2011 | Scott et al. ................... 705/26.4 |
| 2012/0209639 A1* | 8/2012 | Chan et al. ........................ 705/5 |

OTHER PUBLICATIONS

Smale, "HP OpenMail Short Message Service (SMS) Gateway: A Mobile Phone as an E-mail 'Client-of-choice'" INSPEC, 1995.

Marx, et al., "SMS GATEWAY" Comtec, Bern, CH, vol. 76, No. 10, Jan. 1998.

Perelson, "A Model for Secure Value-added Service Subscriptions in Cellular Networks" Proceedings of the ISSA 2006 from Insight to Foresight Conference, Jul. 2006, pp. 1-9.

International Search Report for PCT/EP2009/059301 dated Apr. 6, 2010.

Written Opinion for PCT/EP2009/059301 dated Apr. 6, 2010.

European Office action for 09 780 831.5-1958 dated Apr. 9, 2013.

* cited by examiner

METHOD FOR HANDLING AN ELECTRONIC REQUEST WITH THE AID OF AN INTERMEDIARY ENTITY

The present invention is related to a method for handling an electronic request between two entities with the aid of an intermediary entity, as well as to uses of the method.

More and more people are using web-based directory services to locate vendors of certain goods and/or services. Usually, these directories will provide some information regarding the types of goods and/or services being offered along with an address and contact data such as a telephone or fax number, and increasingly often also an e-mail address. Unfortunately, especially small enterprises will very seldom offer the possibility of being able to make orders online, so the prospective customer will either have to go to the locality of the vendor in order to do business with him directly, or alternatively send an inquiry or request to the vendor via e-mail or fax, or call the vendor to make a request over the telephone. As part of such an inquiry or request a customer may want to place an order or make a reservation with the vendor. The problem with such arrangements that have been entered into based on an e-mail, fax or telephone call, is that the vendor cannot be certain that the customer will actually perform his part of the deal. This means that the alleged customer might for instance not show up at the restaurant for dinner with a party of ten, when the restaurateur has reserved a table for ten for the whole evening, or not pick up the food ordered at a take-way or take-out place, when special dishes have be prepared according to the customer's order, or not pay for a product that the vendor has sent to the customer. Therefore, the vendor is running a considerable risk of being exposed to financial damage when entering into such arrangements. This is especially so, since the identity of the originator is very often not clear and moreover cannot be proved in these instances. On the other hand, a prospective customer will usually prefer not to provide any personal data to the vendor before entering into an actual business agreement. The situation just described is typical for "delivery versus payment"-type business transactions. The reverse situation occurs when the customer for instance makes an advance payment following an order made by either e-mail, fax or over the telephone, when the vendor is not prepared to deliver before receiving a payment. Here the customer will typically want to be certain about the identity of the vendor and furthermore, will also want to receive a tangible acknowledgement in response to his requested order, so that he can be sure that the vendor correctly received and understood it.

It is therefore an object of the present invention to provide a method by which a request can be handled in such a way that both the originator as well as the recipient of the request is clearly identifiable, once the recipient has acknowledged the request, e.g. when a business relationship has been established.

Hence, it is a further object of the present invention to provide a means for keeping the identity of the originator of the request at an anonymous level until the recipient has acknowledged the request, e.g. until a business relationship has been established.

Furthermore, it is an object of the present invention to provide a means for providing a tangible acknowledgement of receipt of a request from the recipient to the originator.

As already mentioned above, small enterprises only seldom offer the possibility of being able to make orders online. This is mainly due to the considerable cost and effort associated with maintaining a website as well as the technical complexity involved in doing so. Therefore, especially small businesses are in need of technically simple means for being able to participate in the rapidly growing area of electronic commerce and web-based business solutions.

Consequently, it is yet another object of the present invention to provide technically simple means to allow a vendor to participate in business solutions provided over the world wide web, more specifically to enable vendors to receive and process requests occurring as part of a web-based business solution.

These objects are achieved in particular by means of the features of the independent claim. Further advantageous embodiments are moreover disclosed in the dependent claims and presented in the description.

The present invention is directed to a method for handling an electronic request between two entities with the aid of an intermediary entity comprising the steps of:

i a first entity sending a request intended for a second entity via an open, first communication network such as the Internet, etc. to an intermediary entity;

ii the intermediary entity forwarding the request as a first text message such as an SMS message via a secure, second communication network such as a GSM network, UMTS network, etc. to a second entity;

iii the second entity either indicating acceptance of the request by sending a second text message back to the intermediary entity via the second communication network, or rejecting the request by preferably not responding;

iv the intermediary entity either confirming that the request has been accepted by providing an acknowledgement of acceptance to at least the first entity, if the second message is received within a maximum response time after sending of the first text message, or indicating that the request has been rejected by the second entity by providing an acknowledgement of rejection to at least the first entity, if no second message is received within the maximum response time after sending of the first text message; and v the intermediary entity logging a result concerning at least the preceding step in an activity log.

Thus, by employing the inventive method the second entity, e.g. a vendor, is able to receive and acknowledge electronic requests using a very commonplace device such a simple GSM (Global System for Mobile Communications) mobile telephone with SMS (short message service) handling capability, which is available even with the cheapest GSM mobile telephones and lowest tier service subscriptions. Furthermore, the second entity does not need to have access to the Internet to be able to receive and respond to requests. The fact that the second entity only requires a mobile terminal provides it with greater freedom and flexibility to move around and still be able to receive and respond to requests independent of location, which can be most beneficial in many applications. In addition, the fact that the second entity indicates rejection of the request by not responding, makes use of the method especially efficient and non-cumbersome, particularly in situations where the second entity is receiving more requests than it can accept, for instance in the case of a restaurateur receiving further table reservations when the entire restaurant is already booked for the entire evening. Furthermore, the first entity is guaranteed to receive a response regarding the outcome of its request from the intermediary entity within a maximum response time, thus relieving the first entity of prolonged uncertainty and giving it the opportunity to send further request to another second entity, if the previous request was rejected.

According to an aspect of the invention the first entity and the second entity, respectively, have to register for service with the intermediary entity prior to being able to send and receive, respectively, requests according to the inventive method. The corresponding registration process comprises the steps of:

- the entity seeking registration accessing a primary website, preferably maintained by the intermediary entity, via the first communication network and providing at least a call number associated with a text message service enabled device such a GSM mobile telephone operable within the second communication network and/or an e-mail address, respectively;
- the intermediary entity sending a verification message as a text message via the second communication network and/or an e-mail via the first communication network, respectively, to the entity seeking registration;
- the entity seeking registration acknowledging receipt of the verification message by sending an acknowledgement message as text message via the second communication network and/or as an e-mail via the first communication, respectively, back to the intermediary entity;
- the intermediary entity accepting registration upon receiving the acknowledgement message.

Hence, this aspect of the invention provides that before providing service the identities of both the first and second entity is verified by the intermediary entity, which can act as an independent, trusted third party, since the intermediary entity is neither a customer nor a vendor, and therefore is not a party to potential business agreements established between the first and second entity.

Furthermore, all the necessary contact information required to handle a request resides with the intermediary entity, thus for instance making it possible to keep anonymous the first entity until the second entity acknowledges the first entity's request and thus indicates willingness to enter into a business relationship with the first entity. Also, certain private contact information such as for instance the telephone number of the second entity's mobile terminal with which it receives requests does not need to be disclosed to the first entity.

In addition, the registration process according to the invention provides the opportunity for the intermediary entity to demand acceptance of certain predefined business rules, which will be legally binding for all registered users. As a result, business relationships established based the inventive method will be more likely to always have a positive outcome since not abiding by the predefined business rules will entail legal consequences for the fallible party.

An embodiment of the present invention is characterised in that the acknowledgement of acceptance is sent to the first and preferably also to the second entity, respectively, as a third and fourth text message, respectively, via the second communication network, and the acknowledgement of rejection is sent to the first and preferably also to the second entity, respectively, as a third and fourth text message, respectively, via the second communication network.

Consequently, the acknowledgement message is sent from the second entity through the intermediary entity to the first entity entirely via the secure, second network. This is beneficial in view of the possibility of having to provide proof of the transmissions having taken place with the originator and recipient, respectively, of the request. Such proof is made possible when employing a secure network, i.e. a network that provides unambiguous identification of the involved entities as well as a reliable authentification mechanism. Both these requirements are fulfilled by digital mobile telephone systems such as the Global System for Mobile Communications (GSM), where each terminal incorporates a subscriber identity module (SIM) that contains an international mobile subscriber identity (IMSI) used to identify the subscriber to the system along with a secret key for authentication purposes. This system is completely tamper-proof, so transmission of for instance short message service (SMS) text messages can be tracked with absolute positiveness using the transport protocols of the system. Since in most countries a SIM card is only dispensed to a subscriber after presenting an official personal identification such as a passport, activities related to a certain IMSI can always be assigned to a specific person. This makes it possible to verify which person was the originator and which person was the recipient of a certain request. This information can form the basis for enforcing a binding legal agreement concerning an offer related to a request.

Furthermore, the first entity, e.g. a customer, receives an acknowledgement of acceptance or rejection as a text message, i.e. in a tangible form, which can for instance be used as receipt or as voucher when completing the transaction initiated by the request. More generally, it can be provided as evidence, e.g. to the second entity, when required to prove that the request was accepted. Additionally, the fact that the acknowledgement is sent as a text message over a mobile communication network makes things very practical for the first entity, because it can move around freely whilst still being able to receive acknowledgement messages independent of location.

This embodiment of the inventive method further provides the second entity with a confirmation that its acceptance of the request was received within the maximum response time, and was therefore passed on to the first entity. This is significant in view of the fact that the second entity may well loose track of the time that has elapsed since receiving a request.

A further embodiment of the present invention is characterised in that the acknowledgement of acceptance is sent to one or more further entities as a text message via the second communication network.

Therefore, multiple entities can be informed about the outcome of the request. For instance, if the first entity, e.g. a secretary has requested a reservation for a table of three for her boss and two further work colleagues, not only the secretary can be informed about the successful reservation but at the same time also all three dinning parties.

A further embodiment of the present invention is characterised in that the acknowledgement of acceptance is sent to the first and second entity, respectively, as a first and second e-mail, respectively, via the first communication network, and the acknowledgement of rejection is sent to the first and second entity, respectively, as a first and second e-mail, respectively, via the first communication network.

A further embodiment of the present invention is characterised in that the acknowledgement of acceptance is sent to one or more further entities as an e-mail via the first communication network.

Hence, the acknowledgement message is also provided through alternative means increasing the reliability of this embodiment of the inventive method for providing timely feedback. For instance, this can be especially useful when working at a computer in an office inside a building where reception of for example a GSM radio frequency signal is not possible because of the shielding effect of the walls, ceiling and floors made of reinforced concrete. The e-mail message can still be received in this situation.

A further embodiment of the present invention is characterised in that data from entries in the activity log associated with a certain entity can be retrieved via the first communication network by that certain entity from the primary website.

Thus the status of pending and past requests can be retrieved from the primary website, so in case the first and/or second entity requires a status overview, such an overview is obtainable for instance via a computer that is connected to the Internet. This is especially helpful for the second entity if it has received a large number of requests and lost track of these, e.g. a restaurateur who has received many requests for table reservations spread out over many days, and who now wants to obtain an overview of the booking situation for the coming weekend in order to plan staffing of the service personnel.

A further embodiment of the present invention is characterised in that contact information associated with the first entity is provided to the second entity as part of the data related to requests that have been accepted within the maximum response time.

Therefore, contact information associated with the first entity, e.g. its call number, is provided to the second entity as soon as the first entity's request has be accepted, implying that both entities are willing to enter into a business agreement. This allows the first entity to remain essentially anonymous until the second entity is prepared to fulfil the request of the first entity, but for instance requires the first entity's contact information to fully do so. Furthermore, this contact information allows the second entity to contact the first entity if necessary in conjunction with the request, e.g. the restaurateur calls the customer in order to inform the customer that the restaurant was flooded last night and all reservations need to be cancelled for the next couple of days.

In addition, by providing the second entity with contact information associated with the first entity only upon accepting a request within the maximum response time, it is possible to prevent the second entity from directly contacting the first entity, and thus circumventing the intermediary entity. The latter is especially undesirable in cases where the intermediary entity only charges a fee when a request has been accepted.

A further embodiment of the present invention is characterised in that the maximum response time is set according to a corresponding entry in a user profile associated with the second entity.

The maximum response time can thus be set by the second entity according to its needs by changing the corresponding entry in its profile for instance by accessing the profile via the primary website or by calling the intermediary entity. This also allows to take into account the various possible requirements of different usages of the inventive method.

A further embodiment of the present invention is characterised in that the maximum response time is set according to a corresponding entry sent by the first entity as part of the request and that this set maximum response time is provided to the second entity as part of the first text message.

Hence, the maximum response time can be set by the first entity, allowing it to communicate to the second entity how long it is willing to wait for a response. For instance the first entity may want to receive a response within a short time period, so that in case its request is rejected it can submit a further request to an alternative second entity. By receiving the maximum response time as part of the request the second entity can explicitly identify urgent requests and prioritise responding to them, especially when receiving many requests within a brief period time.

A further embodiment of the present invention is characterised in that step ii includes:

the intermediary entity selecting from a pool of call numbers allocated to the intermediary entity, a call number with present status "not in use" as an originator call number, changing the status of the corresponding call number in the pool of call numbers to "in use", and sending the first text message via the second communication network using the selected call number as the originator call number and the call number of the second entity as the recipient call number.

This embodiment of the inventive method allows the intermediary entity to handle multiple requests concurrently with a limited number of call numbers. By employing a separate call number for each request, it is easy for the intermediary entity to track individual requests based upon identifying the originator call number and the recipient call number, which are both provided as part of the call protocol. If such a request tracking scheme is employed, multiple call numbers, i.e. a pool of call numbers must be available to the intermediary entity in order to be able to handle multiple concurrent requests, where each request may potentially block a call number for a period of time equal to the maximum response time.

A further embodiment of the present invention is characterised in that the caller ID, i.e. the number displayed as the originator number on the recipient's terminal, is the same for each of the call numbers that are in the pool of call numbers allocated to the intermediary entity when being used as an originator call number.

This is beneficial in that the intermediary entity can always identify itself to the second entity (and also to the first entity) by using the same caller ID even when employing different call numbers, thus making it easier for the second entity (as well as for the first entity) to clearly identify the caller as the intermediary entity. Contrary to this, the use of multiple caller IDs, each associated with one of the different available call numbers, could possibly lead to an uncertainly with the recipients regarding the identify of the call originator.

A further embodiment of the present invention is characterised in that step iv includes:

changing the status of the call number within the pool of call numbers corresponding to the recipient call number, used by the second entity to send the second text message to the intermediary entity, to "not in use" upon receiving the second text message, or if no second message is received within the maximum response time after sending of the first text message.

This enables that the intermediary entity can immediately reuse a call number within the pool as soon as a response from the second entity has been received or the maximum response time has elapsed.

A further embodiment of the present invention is characterised by the further step of:

the first entity accessing an offer website via the first communication network, said offer website presenting at least one offer provided by the second entity, the first entity selecting an offer provided by the second entity and generating a request associated with said offer, being carried out prior to sending the request to the intermediary entity according to step i.

Thus the first entity can view the offerings of the second entity on a website and initiate a request for a specific offer via that website. This website may be solely associated with the second entity and present only its offerings, or it may be a website presenting the offerings of different second entities, where the first entity can browse various offers and enter search criteria to find the offers of interest. The latter especially provides small enterprises with an opportunity to present their offerings on a dedicated, centralised web platform without having to set up and maintain their own website.

A further embodiment of the present invention is characterised in that the offer website and the primary website are both part of the same website.

Here the offerings of different second entities as well as the web-based processes associated with the handling of requests by the intermediary entity are both collocated on the same website, which is preferably maintained by the intermediary entity.

A further embodiment of the present invention is characterised in that if no second message is received within the maximum response time after sending of the first text message, the second entity's offers according to the request forwarded as the first text message will no longer be selectable from the offer website for an unavailability period of time.

A further embodiment of the present invention is characterised in that the unavailability period of time is set according to a corresponding entry in the user profile associated with the second entity.

In order to minimise the number of unnecessary future requests related to offers that are likely not available currently, offers associated with rejected requests are set to "not selectable" for a certain period of time, which can for instance be defined by the second entity. This mechanism allows the second entity to implicitly withdraw an offer for a certain amount of time, when it is no longer available, simply by rejecting an associated request. In this way, the second entity is not required to communicate with the offer website in order to withdraw such offers. Moreover, the second entity can at any time make an offer selectable again, especially in cases where an offer has been made unavailable due to missing to respond to a request within the maximum response time.

The inventive method can be used in conjunction with a number of applications as outlined in the following.

A use of the inventive method and embodiments thereof related to establishing a binding legal agreement between the first entity and second entity concerning the offer requested by the first entity and provided by the second entity, initiation and acceptance or rejection of which offer is verifiable with the aid of the activity log maintained by the intermediary entity.

Such binding legal agreements are important in the context of "delivery versus payment"-type business transactions, where either the vendor or the customer takes on a certain financial risk by fulfilling their part of the business deal before the other party fulfils theirs. This is for example the case when a customer makes an advance payment and the vendor sends the goods to the customer once he has received this payment, or conversely, when the vendor sends goods to a customer who wants to look at them in detail before making a final decision as to whether he wants to pay for them or return them back to the vendor. In both instances the party taking the first step runs the risk of incurring a financial loss if the other party does not abide to their part of the deal. The use of the inventive method provides a means for tracking the request from its initiation through to its acceptance and for identifying the involved parties with definiteness, all based upon the activity log recorded and maintained by the intermediary entity acting as a trusted, independent third party, possibly along with associated transport protocols maintained by the operators of the communication networks used to carry out the inventive method. This possibility of making available clear proof regarding the transmission of a request as well as regarding the involved parties, together with the provision that all involved parties have agreed to accept certain legally binding business rules upon registering with the service of the intermediary entity, forms the basis for the legal enforceability against a fallible party of the agreement established between the parties by means of the inventive method.

Another use of the inventive method and embodiments thereof is related to making a reservation at a locality such as a restaurant or a theatre, where the first entity corresponds to a prospective guest seeking a reservation such as a space, table and/or seating reservation at the locality of the second entity, and the second entity corresponds to a vendor providing a corresponding offering for instance via the offer website.

Especially service providers such as restaurants and bars, movie and music theatres, train operators, parking space providers, beauty and hairdresser salons, physicians and therapist, etc. offering (e.g. seating or parking) space at their facilities and/or their time to customers can benefit from the use of the inventive method in order to handle reservations and/or appointments efficiently and in a legally binder manner. Such businesses will reserve their resources (e.g. space and/or time) for customers who have made reservations and/or appointments with them. If such a customer does not show up, the service provider will potentially suffer a loss of income, especially if other potential customers were turned down in the meantime due to the pending reservation and/or appointment of the no-show customer. Reservations and/or appointments handled according to the inventive method are fully traceable and can provide proof of identity of the involved parties, thus providing the possibility of taking legal action against the no-show customer in order to receive compensation for lost profits. On the other hand, customers of such service providers often want to make ad hoc, short-term reservations or appointments with these businesses. After having requested a reservation and/or appointment the customer typically wants to receive feedback from the service provider as quickly as possible, so that if the customer's request is rejected, the customer has the opportunity to send further requests to alternative service providers until his request is accepted, the provider's acceptance of the request also implying a guarantee to actually render the requested service to the customer, thus safeguarding him from inconveniences. Such customer requirements are met by reservations and/or appointments handled according to the inventive method. Use of the inventive method as indicated above especially provides small enterprises with a technically simple, efficient and economical means to participate in electronic commerce and web-based business solutions.

Yet another use of the inventive method and embodiments thereof is related to making an order in conjunction with a food take-away or take-out service, or a food home delivery service, where the first entity corresponds to a prospective customer seeking catering from the second entity, and the second entity corresponds to a vendor providing a corresponding offering for instance via the offer website.

Use of the inventive method for ordering goods such as for instance food to be picked up at a take-away or take-out service, or food to be delivered to a customer's home provides much the same benefits to both customers and vendors as outlined above in conjunction with making reservations and/or appointments.

A further use of the inventive method and embodiments thereof is related to providing unsolicited product and/or service offerings, especially for offerings having a very limited period of availability, for instance with an availability restricted to on the order of less than a day, where the first entity corresponds to a vendor of corresponding products and/or services and the second entity corresponds to a potential buyer of corresponding products and/or services from the first entity.

Use of the inventive method for providing unsolicited product and/or service offerings such as for instance offers for sale of financial products, e.g. securities, stocks, bonds, options, derivatives, etc., offers for sale of commodities, e.g. heating oil, fuel, etc., special offers, e.g. promotional, discount, bargain or clearance offers, limited-availability offers, e.g. time-limited or limited-quantity offers, offers for selected customers, etc., enables vendors to rapidly distribute offerings to a specific community of potentially interested buyers. The inventive method especially allows to rapidly receive back a definite purchase order from a buyer using technical means available to all potential buyers anytime and anyplace they may be, i.e. particularly when they are on the go and difficult to reach by other means than e.g. via text messages. It is therefore most suitable for providing short-term offers, i.e. offers with a short validity period, to potential buyers. Moreover, the inventive method is beneficial in that it makes available the contact information of the vendor, i.e. the first entity, to the buyer, i.e. the second entity, upon acceptance of an offer, thus allowing the buyer to contact the vendor for instance to discuss details regarding the delivery of the purchased goods. Potential buyers are able to sign up for certain types of offers and this information is stored as part of their user profile, which can be changed anytime for instance via the offer website. Consequently, a potential buyer only receives offers regarding items that are probably of interest to him.

Yet a further use of the inventive method and embodiments thereof is related to providing an order confirmation, where the first entity corresponds to a vendor of a product and/or service and the second entity corresponds to a buyer of the corresponding product and/or service from the first entity, and where the second entity has ordered a corresponding product and/or service from the first entity, and first entity sends a request to the intermediary entity according to step i, the request prompting to confirm the order made by the second entity 2.

Use of the inventive method for providing order confirmations, such as for instance confirmations of orders related to financial products, e.g. stock trades, etc. and particularly to orders having a high monetary value, enables the vendor, i.e. the first entity, who has received the order from the buyer, i.e. the second entity, to verify the validity of the order by requesting a confirmation of the order from the customer via a secondary means, e.g. an SMS message, which is separate from the means via which the order was originally place, e.g. through a website. Such a use of the inventive method could also allow for instance a credit card provider to verify orders placed by a buyer over the Internet on a vendor's website before approving the transaction with the customer's credit card.

The present invention is described in detail in the following by way of examples of specific embodiments within the context of certain applications. These embodiments and applications are for illustrative purposes only and shall in no way be used to limit the scope of the present invention.

Figure 2:
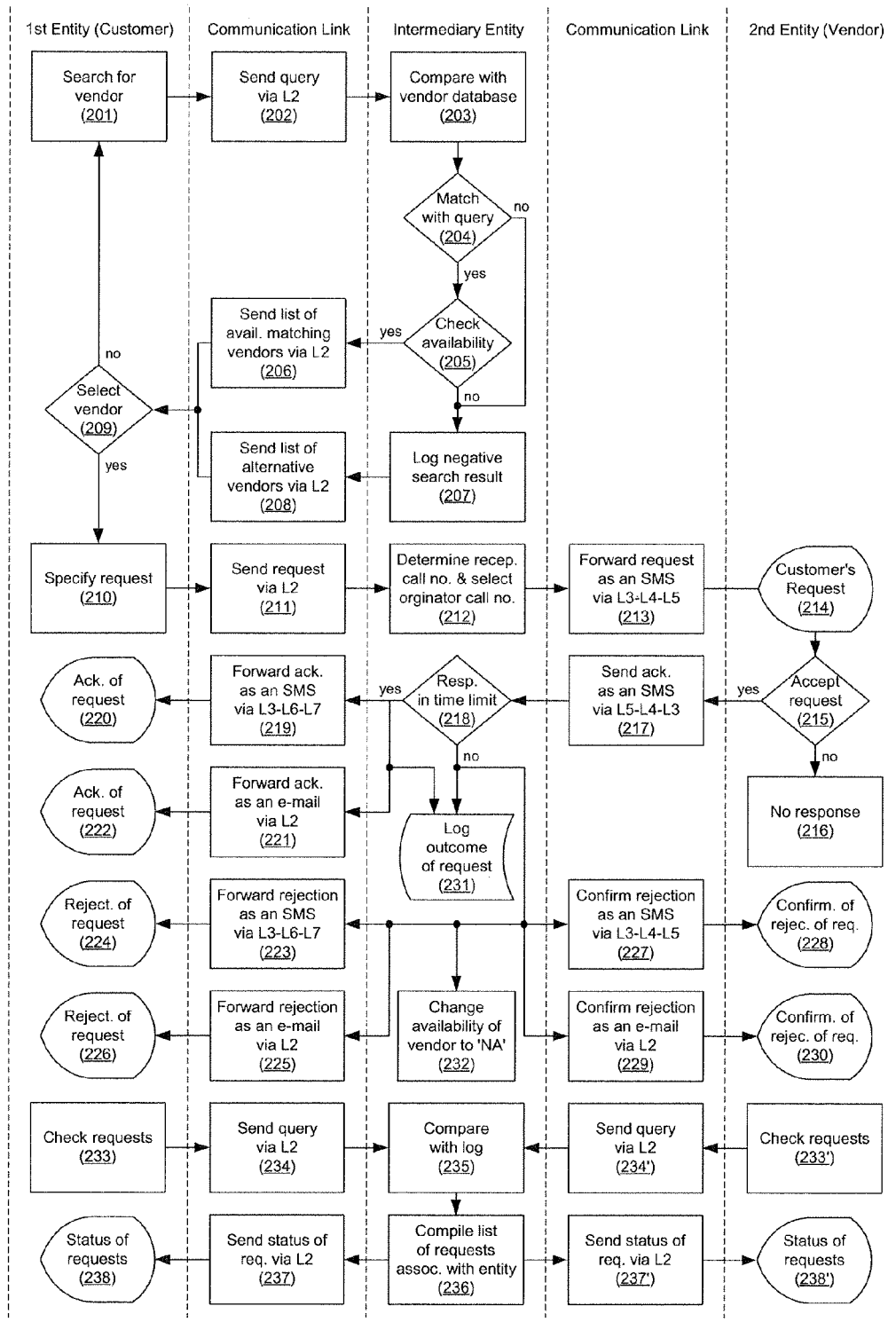

The attached figures will help to further explain the present invention, where:

FIG. 1 shows a block diagram of a system suitable for carrying out various embodiments of the inventive method; and FIG. 2 shows a flowchart related to a specific embodiment of the inventive method.

Within the context of a first application such as for instance the use of the inventive method for making reservations or appointments the second entity, referred to by the reference number 2 in FIG. 1, corresponds to a vendor who makes available at least one offer, e.g. tables at a restaurant for dinning In order to publicise its offers to potential customers such as a first entity 1, the second entity 2, i.e. the vendor, submits the offers to an offer website 6', where they are stored in a corresponding database 7', and where they can be viewed and selected by potential customers such as the first entity 1. The offer website 6' can be the website of the second entity 2, i.e. the vendor itself, or for instance the website of a directory service presenting the offers of multiple vendors. The offer website 6' can for example also be the website of a business association, which provides a web-based information platform for its members. Furthermore, the offer website 6' can coincide with the website of an intermediary entity 3, whose website is referred to here as the primary website 6.

In order to be able to receive requests associated with its offers according to the inventive method the second entity 2 must sign up for service with the intermediary entity 3. To sign up for the intermediary entity's service, the second entity 2 preferably has to complete a registration process via the primary website 6, which can be accessed via an open, first communication network such as for instance the Internet 4, e.g. through the communication link L1. This registration process comprises providing at least a call number (e.g. the telephone number) associated with a text message service (e.g. short message service, SMS) enabled device such as a GSM mobile telephone as well as an e-mail address of the second entity 2. The registration information associated with the second entity 2 is stored in the database 7 of the primary website 6. In order to verify the identity of the party seeking registration, the intermediary entity 3 sends a text message (e.g. an SMS) via a secure, second communication network such as the GSM network 5. The text message may be delivered to the second entity's mobile terminal 11' for instance via an SMS gateway 8 operated by a separate gateway operator and an SMS service centre (SMS-SC) 9 operated by the GSM network operator X, since the second entity 2 is a subscriber of operator X' GSM network, e.g. through the communication links L3-L4-L5. Alternatively, the intermediary entity 3 can forward the text message directly to the SMS-SC 9, e.g. via the communication link L34, if the SMS gateway functionality is included as part of the intermediary entity's own infrastructure. The intermediary entity 3 accepts registration from the second entity 2 if the intermediary entity 3 receives back an acknowledgement text message (e.g. an SMS) from the second entity 2 in response to the intermediary entity's text message. The verification is performed via a secure, second communication network such as the GSM network 5 since the parties involved in all transmissions can be identified with absolute positiveness based on their international mobile subscriber identity (IMSI), which is contained in the subscriber identity module (SIM) incorporated in each GSM terminal. Equally reliable verification is far more difficult to assure if performed via an open, first communication network such as the Internet 4.

According to an embodiment of the inventive method a potential customer such as a first entity 1 who is looking for example for a restaurant to have dinner there, will search for possible vendors (e.g. restaurants) by browsing the world wide web. The potential customer such as the first entity 1 can do this using a computer 10 connected to the Internet 4 or alternatively using a mobile terminal incorporating wireless connectively such as a smartphone. The latter has the advantage that it allows to access the Internet 4 from any location providing a corresponding wireless access. In order for the potential customer such as the first entity 1 to be able to take advantage of the inventive method for example to make a reservation, he will access an offer website 6' or directly the primary website 6.

According to the block referred to by the reference number 201 in the flowchart depicted in FIG. 2 the first entity 1, i.e. the customer, will search for a vendor, i.e. a second entity, that meets his needs, e.g. a restaurant which is located at a certain place and/or provides a certain kind of food, and submit a corresponding query to the intermediary entity 3, e.g. via the communication link L2 (see block 202). The intermediary entity 3 will then look for vendors, which meet the search criteria in the database 7 (see block 203). If the intermediary entity 3 finds vendors, which match the search criteria (see block 204) it will check their availability (see block 205), e.g. check whether the corresponding restaurants are open and still have free tables for dinner. Subsequently, a list of matching vendors is provided to the first entity 1, i.e. the customer, which will retrieve this list from the website 6, e.g. via the communication link L2 (see block 206). If there are no vendors which match the search criteria or the matching vendors are not available, e.g. for making reservations, this negative search result is saved in a search log (see block 207), which is stored in the database 7, and a list of available alternative vendors is provided to the first entity 1, i.e. the customer, which will retrieve this list from the website 6, e.g. via the communication link L2 (see block 208).

Based on the provided list the first entity 1, i.e. the customer, will either search for another vendor or select a vendor from the provided list of available vendors (see block 209)—this corresponds to selecting an offer provided by a second entity—and specify a request (see block 210) directed to the second entity 2, i.e. the selected vendor. Such a request may specify for instance the first entity's, i.e. the customer's requirements related to the selected offer, e.g. date and time of reservation and number of guests, as well as the first entity's, i.e. the customer's requirements related to responding to the request such as for example a maximum response time. In order to be able to submit the request the first entity 1, i.e. the customer, must provide login information, e.g. a user name and a password, to the primary website, which in turn requires that the first entity 1, i.e. the customer, has previously signed up for service with the intermediary entity 3, and therefore has completed the registration process as described above for a second entity 2, i.e. a vendor. After the login information has been provided the request can be submitted to the intermediary entity 3, e.g. via the communication link L2 (see block 211).

The intermediary entity 3 then determines from the database 7 the call number, e.g. the telephone number of a GSM telephone, of the vendor selected by the first entity, i.e. the customer, and selects a free originator call number from a pool of call numbers assigned to the intermediary entity 3 by for instance the SMS gateway operator or the GSM network operator, under which originator call number the request will be handled (see block 212). By handling each request under a separate call number it is easy for the intermediary entity 3 to track individual requests based on identifying the originator call number and the recipient call number, which are both provided as part of the call protocol. When using this scheme a call number will be blocked until either a response to the request associated with the call number has been received or a maximum response time has elapsed. Therefore, a pool of call numbers is necessary in order to handle multiple parallel requests, where the maximum number of requests that can be handled at the same time is equal to the number of call numbers in the pool. Furthermore, the intermediary entity 3 may add for instance the name of the first entity 1, i.e. the customer, to the request before forwarding it to the second entity 2. Additionally, in order to allow easy identification of the intermediary entity 3 as originator of the call, despite the fact that different originator call numbers from the pool of call numbers can be used, the caller ID, i.e. the number displayed as the originator number on the recipient's terminal, is set to a number that is known by the second entity 2 to be associated with the intermediary entity 3. Subsequently, the request is sent to the second entity's mobile terminal 11' as a text message, e.g. via the SMS gateway 8 and the SMS-SC 9, e.g. through the communication links L3-L4-L5 (see block 213).

The second entity 2, i.e. the vendor, is then able to read the text message on its mobile terminal 11' (see block 214), and depending on whether it can meet the requirements of request it will then either accept or rejected the request (see block 215). Rejection of the request is preferably indicated by not responding to the request (see block 216). On the other hand, if the request is to be accepted, this is indicated by sending back a text message to the intermediary entity 3, e.g. via the SMS-SC 9 and the SMS gateway 8, e.g. through the communication links L5-L4-L3 (see block 217), preferably using the mobile terminal's reply function without entering any answer text, where such a reply function will send a reply message to the originator call number of the received text message.

If the response text message is received by the intermediary entity 3 within a predetermined maximum response time after sending the request to the second entity 2 (see block 218), where the value of the maximum response was previously set either according to an entry in the user profile of the second entity 2 or according to a entry sent by the first entity 1 as part of the request, the intermediary entity 3 confirms that the request has been accepted by providing an acknowledgement of acceptance to the first entity 1. Such an acknowledgement of acceptance (see block 220) is sent in the form of a text message to the first entity's mobile terminal 11, e.g. via the SMS gateway 8 and the SMS-SC 9' operated by the GSM network operator Y, since the first entity 1 is a subscriber of operator Y, e.g. through the communication links L3-L6-L7 (see block 219). A further acknowledgement of acceptance (see block 222) is sent in the form of an e-mail to the first entity's e-mail address, e.g. through the communication link L2 (see block 221), e.g. via an e-mail server (not shown in FIG. 1) connected to the Internet 4.

If no response text message is received by the intermediary entity 3 within the predetermined maximum response time after sending the request to the second entity 2 (see block 218) the intermediary entity 3 indicates or confirms, respectively, that the request has been rejected by providing an acknowledgement or confirmation, respectively, of rejection to the first entity 1 and to the second entity 2, respectively.

Such an acknowledgement or confirmation, respectively, of rejection (see blocks 224 & 228, resp.) is sent in the form of a text message to the first entity's mobile terminal 11, e.g. via the SMS gateway 8 and the SMS-SC 9', e.g. through the communication links L3-L6-L7 (see block 223), and to the second entity's mobile terminal 11', e.g. via the SMS gateway 8 and the SMS-SC 9, e.g. through the communication links L3-L4-L5 (see block 227), respectively. A further acknowledgement or confirmation, respectively, of rejection (see blocks 226 & 230, resp.) is sent in the form of an e-mail to the first and second entity's e-mail address, respectively, e.g. through the communication link L2 (see block 225 & 229, resp.), e.g. via an e-mail server connected to the Internet 4.

In both cases the outcome of the request is saved in an activity log (see block 231) by the intermediary entity 3, which activity log is stored in the database 7. Moreover, if the request is rejected the availability of the second entity's, i.e. the vendor's offer according to the rejected request will be set to unavailable (see block 232) for an unavailability period of time following determination that the request has been rejected, after which unavailability period of time the corresponding offers will be set back to available again. The availability of the second entity's, i.e. the vendor's offers is stored in the database 7. If the availability of an offer is set to unavailable, it cannot be selected by a potential customer such as the first entity 1. The unavailability period of time, i.e. the time until which an offer is unavailable, can also be set according to a corresponding entry in the user profile associated with the second entity 2, i.e. the vendor. This allows the second entity 2, i.e. the vendor to provide information regarding the availability of an offer, e.g. to indicate when the restaurant is open, and especially to change such availability information if it is incorrect, e.g. because the second entity 2, i.e. the vendor, failed to respond within the maximum response time despite wanting to accept the request, which led to offers according to the rejected request to be set to unavailable.

Any party who has registered for service with the intermediary entity 3, e.g. a first or a second entity, respectively, i.e. a customer or a vendor, respectively, can check the status of requests with which they are associated (see blocks 233 & 233', resp.). They can do so by accessing the primary website 6 via their computer 10 or 10', resp., providing their login information and then sending a status query, e.g. via the communication link L2 (see blocks 234 & 234', resp.). The intermediary entity 3 will then compile a list of all or some selected requests, depending on the query, which list contains data regarding the status of the individual requests (see blocks 235 & 236), and make the list available via the primary website 6 to the party who sent the query. The party can then retrieve the list (see blocks 238 & 238', resp.) from the website 6 to their computer 10 or 10', resp., e.g. via the communication link L2 (see blocks 237 & 237', resp.). As part of that data particularly contact information, e.g. a mobile telephone number, e-mail address, etc. of the first entity 1, i.e. the customer, is provided to the second entity 2, i.e. the vendor. This information can be used by the second entity 2, i.e. the vendor to contact the first entity 1, i.e. the customer, in order to exchange further information related to the request if need be.

It should be pointed out that for other uses of the inventive method the roles the customer (or buyer) and the vendor (or seller) may be reversed as indicated in the following examples.

For instance when using the inventive method for providing unsolicited, short-term product and/or service offerings, the first entity 1 corresponds to a vendor (or seller) of corresponding products and/or services and the second entity 2 corresponds to a potential buyer (or customer) of corresponding products and/or services. A practical application of such a use of the inventive method could be to provide an offer for sale for a commodity such as heating oil at a discount price, where only a limited quantity is available at that price. The seller 1 can efficiently distribute such an offer to a large number of potential buyers and receive back offer acceptance text messages from willing buyer according to the inventive method.

As further example, when using the inventive method for providing order confirmations, the first entity 1 corresponds to a vendor (or seller) of products and/or services and the second entity 2 corresponds to a buyer (or customer) of the corresponding products and/or services from the first entity 1.

A practical application of such a use of the inventive method could be to confirm stock trades submitted for instance via the website of a bank, the confirmation being made by means of an text message according to the inventive method.

Although several details of the preceding description of the invention relate to the special case of embodiments employing GSM networks and SMS messages, the latter being a specific service provided by such networks, the ones skilled in the art will understand that the inventive method can also be practised using other types of mobile networks such as for instance another second generation (2G), a 2.5G or a third generation (3G) wireless communication network, e.g. EDGE, UMTS, CDMA2000, DECT, WiMAX, etc., along with their corresponding text message services.

The invention claimed is:

1. A method for handling an electronic request between two entities with the aid of an intermediary entity comprising the steps of:
   i a first entity using a communication device of the first entity for sending a request intended for a second entity via an open, first communication network to an intermediary entity;
   ii the intermediary entity forwarding the request as a first text message via a secure, second communication network to a communication device of the second entity;
   iii subsequent to the communication device of the second entity receiving said first text message, the second entity either using the communication device of the second entity for indicating acceptance of the request by sending a second text message back to the intermediary entity via the second communication network, or rejecting the request by sending a rejection message or by not responding;
   iv the intermediary entity either confirming that the request has been accepted by providing an acknowledgement of the acceptance by the second entity to at least the communication device of the first entity or another communication device of the first entity if the second text message is received within a maximum response time after sending of the first text message, or indicating that the request has been rejected by the second entity by providing an acknowledgement of the rejection to at least the communication device of the first entity or the other communication device of the first entity, if the rejection message has been received or no second message is received within the maximum response time after sending of the first text message; and
   v a device of the intermediary entity logging a result concerning at least the preceding step in an activity log, wherein the acknowledgement of acceptance is sent to the communication device of the first entity as a third text message, via the second communication network, and the acknowledgement of rejection is sent to the communication device of the first entity as a third text message, via the second communication network.

2. The method according to claim 1, wherein the acknowledgement of acceptance is sent to communication device(s) of one or more further entities as a text message via the second communication network.

3. The method according to claim 1, wherein data from entries in the activity log associated with a certain entity can be retrieved via the first communication network by that certain entity using a communications device from the primary website.

4. The method according to claim 3, wherein contact information associated with the first entity is provided to the communication device of the second entity as part of the data related to requests that have been accepted within the maximum response time.

5. The method according to claim 1, wherein the maximum response time is set according to a corresponding entry in a user profile associated with the second entity.

6. The method according to claim 1, wherein the maximum response time is set according to a corresponding entry sent by the communication device of the first entity as part of the request and that the set maximum response time is provided to the communication device of the second entity as part of the first text message.

7. The method according to claim 1, wherein step ii includes:
the intermediary entity selecting from a pool of call numbers allocated to the intermediary entity, a call number with present status "not in use" as an originator call number, changing the status of the corresponding call number in the pool of call numbers to "in use", and sending the first text message via the second communication network using the selected call number as the originator call number and the call number of the second entity as the recipient call number.

8. The method according to claim 7 wherein, the caller ID, number displayed as the originator number on the recipient's communication device is the same for each of the call numbers that are in the pool of call numbers allocated to the intermediary entity when being used as an originator call number.

9. The method according to claim 7, wherein step iv includes:
changing the status of the call number within the pool of call numbers corresponding to the recipient call number, used by the second entity to send the second text message to the intermediary entity, to "not in use" upon receiving the second text message, or if no second message is received within the maximum response time after sending of the first text message.

10. The method according to claim 1, further comprising the step of:
the first entity using a communication device for accessing an offer website via the first communication network, said offer website presenting at least one offer provided by the second entity, the first entity using the communication device for selecting an offer provided by the second entity and generating a request associated with said offer, being carried out prior to sending the request to the intermediary entity according to step i.

11. The method according to claim 10, wherein the offer website and the primary website are both part of the same website.

12. The method according to claim 10, wherein, if no second message is received within the maximum response time after sending of the first text message, the second entity's offers according to the request forwarded as the first text message will no longer be selectable from the offer website for an unavailability period of time.

13. The method according to claim 12, wherein the unavailability period of time is set according to a corresponding entry in the user profile associated with the second entity.

14. The method according to claim 1 further comprising making a reservation at a business locality, where the first entity corresponds to a prospective guest seeking a reservation such as a space, table and/or seating reservation at the locality of the second entity, and the second entity corresponds to a vendor providing a corresponding offering for instance via the offer website.

15. The method according to claim 1 further comprising making an order in conjunction with a food take-away or take-out service, or a food home delivery service, where the first entity corresponds to a prospective customer seeking catering from the second entity, and the second entity corresponds to a vendor providing a corresponding offering for instance via the offer website.

16. The method according to claim 1, wherein the acknowledgement of acceptance is sent to the communication device of the second entity as a fourth text message via the second communication network, and the acknowledgement of rejection is sent to the communication device of the second entity as a fourth text message via the second communication network.

17. A method for handling an electronic request between two entities with the aid of an intermediary entity comprising the steps of:
vi a first entity using a communication device of the first entity for sending a request intended for a second entity via an open, first communication network to an intermediary entity;
vii the intermediary entity forwarding the request as a first text message via a secure, second communication network to a communication device of the second entity;
viii subsequent to the communication device of the second entity receiving said first text message, the second entity either using the communication device of the second entity for indicating acceptance of the request by sending a second text message back to the intermediary entity via the second communication network, or rejecting the request by sending a rejection message or by not responding;
ix the intermediary entity either confirming that the request has been accepted by providing an acknowledgement of the acceptance by the second entity to at least the communication device of the first entity or another communication device of the first entity if the second text message is received within a maximum response time after sending of the first text message, or indicating that the request has been rejected by the second entity by providing an acknowledgement of the rejection to at least the communication device of the first entity or the other communication device of the first entity, if the rejection message has been received or no second message is received within the maximum response time after sending of the first text message; and
a device of the intermediary entity logging a result concerning at least the preceding step in an activity log, wherein the first entity and the second entity have registered for service with the intermediary entity prior to step i, the corresponding registration process comprising the steps of:
the entity seeking registration using the communication device of the entity for accessing a primary website via the first communication network and providing at least a call number associated with a text message service enabled device operable within the second communication network and/or an e-mail address, respectively;
the intermediary entity sending a verification message as a text message via the second communication network and/or an e-mail via the first communication network, respectively, to the communication device of the entity seeking registration;
the entity seeking registration using the communication device for acknowledging receipt of the verification message by sending an acknowledgement message as text message via the second communication network and/or as an e-mail via the first communication, respectively, back to the intermediary entity;

the intermediary entity accepting registration upon receiving the acknowledgement message.

18. A method for handling an electronic request between two entities with the aid of an intermediary entity comprising the steps of:

x a first entity using a communication device of the first entity for sending a request intended for a second entity via an open, first communication network to an intermediary entity;

xi the intermediary entity forwarding the request as a first text message via a secure, second communication network to a communication device of the second entity;

xii subsequent to the communication device of the second entity receiving said first text message, the second entity either using the communication device of the second entity for indicating acceptance of the request by sending a second text message back to the intermediary entity via the second communication network, or rejecting the request by sending a rejection message or by not responding;

xiii the intermediary entity either confirming that the request has been accepted by providing an acknowledgement of the acceptance by the second entity to at least the communication device of the first entity or another communication device of the first entity if the second text message is received within a maximum response time after sending of the first text message, or indicating that the request has been rejected by the second entity by providing an acknowledgement of the rejection to at least the communication device of the first entity or the other communication device of the first entity, if the rejection message has been received or no second message is received within the maximum response time after sending of the first text message; and a device of the intermediary entity logging a result concerning at least the preceding step in an activity log, wherein the acknowledgement of acceptance is sent to the communication devices of the first and second entity, respectively, as a first and second e-mail, respectively, via the first communication network, and the acknowledgement of rejection is sent to the communication devices of the first and second entity, respectively, as a first and second e-mail, respectively, via the first communication network.

19. The method according to claim 18, wherein the acknowledgement of acceptance is sent to one or more further entities as an e-mail via the first communication network.

20. A method for handling an electronic request between two entities with the aid of an intermediary entity comprising the steps of:

a first entity using a communication device of the first entity for sending a request intended for a second entity via an open, first communication network to an intermediary entity;

the intermediary entity forwarding the request as a first text message via a secure, second communication network to a communication device of the second entity;

subsequent to the communication device of the second entity receiving said first text message, the second entity either using the communication device of the second entity for indicating acceptance of the request by sending a second text message back to the intermediary entity via the second communication network, or rejecting the request by sending a rejection message or by not responding;

the intermediary entity either confirming that the request has been accepted by providing an acknowledgement of the acceptance by the second entity to at least the communication device of the first entity or another communication device of the first entity if the second text message is received within a maximum response time after sending of the first text message, or indicating that the request has been rejected by the second entity by providing an acknowledgement of the rejection to at least the communication device of the first entity or the other communication device of the first entity, if the rejection message has been received or no second message is received within the maximum response time after sending of the first text message;

a device of the intermediary entity logging a result concerning at least the preceding step in an activity log, and establishing a binding legal agreement between the first entity and second entity concerning the offer requested by the first entity and provided by the second entity, initiation and acceptance or rejection of which offer is verifiable with the aid of the activity log maintained by the intermediary entity.

* * * * *